June 26, 1923. Re. 15,634

C. L. SCHNEIDER

WINDOW SASH WEIGHT

Original Filed Jan. 10, 1921

Inventor:
CHRISTIAN L. SCHNEIDER
by Wallace R. Lane Attys.

Reissued June 26, 1923. Re. 15,634

UNITED STATES PATENT OFFICE.

CHRISTIAN L. SCHNEIDER, OF DAVENPORT, IOWA.

WINDOW-SASH WEIGHT.

Original No. 1,426,224, dated August 15, 1922, Serial No. 436,193, filed January 10, 1921. Application for reissue filed March 14, 1923. Serial No. 625,119.

*To all whom it may concern:*

Be it known that I, CHRISTIAN L. SCHNEIDER, a citizen of the United States, residing at Davenport, in the county of Scott and State of Iowa, have invented new and useful Improvements in Window-Sash Weights, of which the following is a specification.

The present invention relates to window sash weights, and more particularly to the class of weights that are adjustable or variable in weight by the adding or subtracting to or from the weight thereof to attain the desired weight of the device.

Among the objects of the invention is to provide this invention with a body, which may or may not have means, such as a hook, for the attaching of added weight to the body of the window sash weight; with a body, preferably elongated and open at one end, having a recess, also preferably elongated, for the reception of weight elements or slugs, together with arms, preferably spaced and extending from the open end of the body for providing a space therebetween for the passage through such space of the weight elements or slugs to or from the recess; with such body and arms, together with a pulley rotatably connected to the arms, preferably at the ends thereof, in spaced relation to or remote from the opening of the body or recess so as to provide a space or passage between the pulley and such open end of the body and recess whereby the weight elements or slugs may be readily passed into or out of such open end of the recess and body; to provide such a sashweight with the advantage of readily varying its weight when counterbalancing the weight of a window sash to which it is attached; and such further objects, advantages and capabilities as will later more fully appear and are inherently possessed by the invention.

Figure 1:
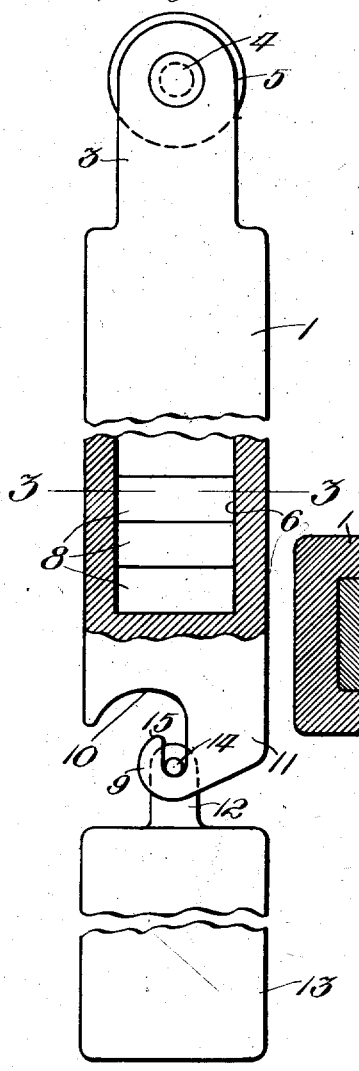
Figure 3:
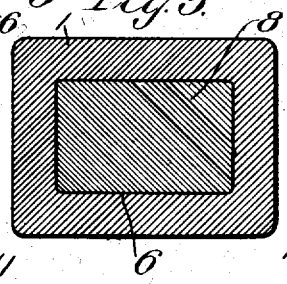
Figure 2:
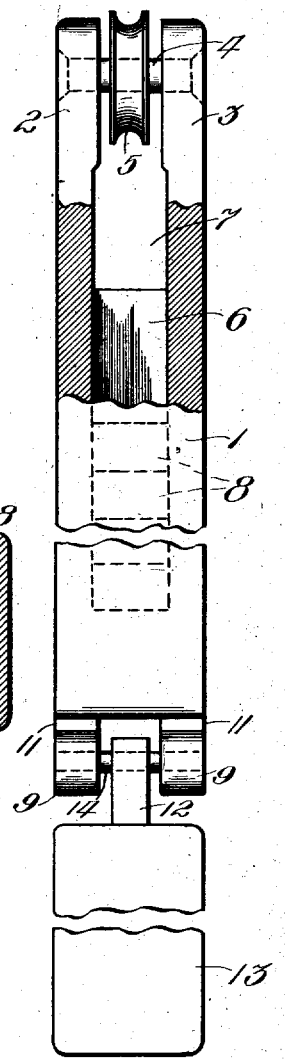

In the drawing illustrating a preferred form of the invention, Fig. 1 is a side elevation, partly in section of the improved sashweight; Fig. 2 is an edge elevation partly in section of the same, and Fig. 3 is a cross-section taken on line 3—3 of Fig. 1.

Referring more particularly to the drawing, the improved sashweight is preferably cast of suitable material, the body 1 thereof being provided with a pair of arms 2 and 3, which are preferably spaced apart. To the upper end of the arms is attached or carried a suitable pin 4 upon which a pulley 5 is rotatably mounted, the pulley preferably having a concave perimeter for receiving the sash weight cord and preventing the latter from slipping off the edge or perimeter of the pulley and binding. The body 1 is provided with a longitudinally extending central recess 6, which may be rectangular in cross-section, and which opens out in the upper end of the body as shown in 7, the other end of the body 1 being closed. The arms 2 and 3 are slightly reduced in thickness for a short distance above the open end 7 to permit the passing of weights or slugs 8 between said arms for depositing or inserting the weights into the recess 6 to increase the weight of the body when necessary. Should it be desired or necessary to further increase the weight of the sashweight over that permitted by the use of the weight elements or slugs 8, hooks 9 may be formed on the lower end of the body 1 for the attachment thereto of an added weight 13. In the specific form shown, the hooks have recesses opening out upwardly in pocket 10 preferably formed in the lower or closed end of the body 1, preferably at the longitudinal center of the bottom or closed end of the body 1, as clearly shown in Figs. 1 and 2 of the drawing. This permits insertion between the downwardly extending hooks 9 of an upstanding lug 12 formed on the upper end of the auxiliary weight 13. The lug 12 carries a pin 14 which extends transversely through the lug 12 and seats in the recesses formed in the hooks 9 as clearly shown in Figs. 1 and 2 of the drawing, in order to suspend the auxiliary weight 13 from the body 1 of the sashweight. The inner walls of the pocket 10 are concavely curved so as to form curved guide surfaces for guiding the entrance of the pin 14 into the pockets or openings of the hooks 9. The latter are provided with bills 15 which project upwardly a sufficient distance from the lower end of the hooks to prevent accidental removal of the ends of the pin 14 from the hooks. For disconnecting the auxiliary weight 13 from the body 1, the auxiliary weight is moved upwardly in a direct vertical line until the pin 14 passes above the upper ends of the bills 15 after which the weight 13 is moved laterally out of the pockets 10.

It will be noted that the arms 2 and 3 extend upwardly from the open end of the body member and are spaced apart to provide a space or passage therebetween for the insertion of the weight elements or slugs 8 when inserting the same into the recess 6 of the body 1. It will also be noted that the pulley 5 is mounted for rotation in spaced relation to the open end of the recess 6 or remote therefrom, in order also to provide therebetween and the open end of recess 6, a space or passage through which the weight elements or slugs 8 may be passed when inserted into or removed from the recess 6.

While I have herein described and shown upon the drawing an embodiment of the invention, it is to be understood that the invention is not limited to the particular construction, details and arrangement of parts shown and described, but that other constructions, details and arrangements of parts are comprehended by the invention without departing from the spirit thereof.

Having now described my invention, I claim:—

1. A window sash weight comprising a rectangular body having a hook arranged at its bottom end and parallel arms extending from its other end and further having a longitudinally centrally arranged recess that opens out at the base of said arms, and a pulley mounted in the upper ends of the arms so as to be spaced from the open end of said recess, and weights adapted to be passed under the pulley and deposited in the open end of the recess.

2. A window sash weight comprising a body having means for attaching added weights thereto and a recess for the reception of weight elements, arms extending from said body and providing a space between said arms for the passage of the weight elements into or from said recess, and a pulley rotatably connected to said arms at a distance from the open end of said recess whereby the weight elements may be deposited into said recess through the space between said pulley and said recess.

3. A window weight comprising a body having a recess therein for receiving weight elements, said body being open at one end thereof, spaced arms extending from the open end of said body, a pulley rotatably connected to said arms in spaced relation to the open end of said body, whereby weight elements may be passed to and from said recess through the space provided between said arms and between said pulley and said open end of said body.

4. A window weight comprising an elongated hollow body providing an elongated recess therein and being open at one end thereof, spaced arms extending from the open end of the body and providing a space therebetween for the ready passage of weight elements to and from said recess, and a pulley rotatably connected to the arms remote from the open end of the said body for providing space for said passage of said weight elements to and from said recess.

5. A window weight comprising a body having a recess therein for receiving weight elements, said body being open at one end thereof, spaced arms extending from the open end of said body, said arms having portions thereof reduced in thickness near the open end of said body, a pulley rotatably connected to said arms in spaced relation to the open end of said body, said reduced portions of said arms and said pulley and the open end of said body being so arranged that the weight elements may be readily passed to or from said recess through the space provided between the reduced portions of said arms and between said pulley and said open end of said body.

CHRISTIAN L. SCHNEIDER.